United States Patent
Burger

(10) Patent No.: US 10,301,120 B2
(45) Date of Patent: May 28, 2019

(54) MECHATRONIC SAFETY SYSTEM FOR AMUSEMENT RIDES, AND IN PARTICULAR ROLLER COASTERS, CAROUSELS AND THE LIKE

(71) Applicant: Mack Rides GmbH & Co. KG, Waldkirch (DE)

(72) Inventor: Günter Burger, Waldkirch (DE)

(73) Assignee: Mack Rides GmbH & Co. KG, Waldkirch (DE)

( * ) Notice: Subject to any disclaimer, the term of this patent is extended or adjusted under 35 U.S.C. 154(b) by 0 days.

(21) Appl. No.: 15/516,572

(22) PCT Filed: Oct. 2, 2015

(86) PCT No.: PCT/EP2015/072782
§ 371 (c)(1),
(2) Date: Apr. 3, 2017

(87) PCT Pub. No.: WO2016/050952
PCT Pub. Date: Apr. 7, 2016

(65) Prior Publication Data
US 2018/0134497 A1    May 17, 2018

(30) Foreign Application Priority Data

Oct. 2, 2014    (DE) .................. 10 2014 114 338

(51) Int. Cl.
*B65G 43/02*    (2006.01)
*A63G 1/00*    (2006.01)
(Continued)

(52) U.S. Cl.
CPC .............. *B65G 43/02* (2013.01); *A63G 1/00* (2013.01); *A63G 1/08* (2013.01); *A63G 3/00* (2013.01);
(Continued)

(58) Field of Classification Search
CPC ...................................................... B65G 43/02
See application file for complete search history.

(56) References Cited

U.S. PATENT DOCUMENTS

| 2,857,056 A | 10/1958 | Dilworth |
| 4,679,957 A | 7/1987 | Bauer |

(Continued)

FOREIGN PATENT DOCUMENTS

| CN | 101043926 | 9/2007 |
| CN | 101576445 | 12/2010 |

(Continued)

OTHER PUBLICATIONS

Patent Cooperation Treaty, "International Search Report" and translation thereof, issued in International Application No. PCT/EP2015/072782, by European Searching Authority, document of 6 pages, dated Nov. 25, 2015.

(Continued)

*Primary Examiner* — Timothy R Waggoner
*Assistant Examiner* — Rushin Lester, III
(74) *Attorney, Agent, or Firm* — Akerman LLP; Peter A. Chiabotti

(57) ABSTRACT

A device for increasing the safety of amusement rides, in particular carousels, roller coasters or the like, and comprising at least one mechatronic system, characterized in that the mechatronic system comprises means for taking over completely or at least partially the function, in particular the support function, of a mechanic component in the event of a defect thereof and to detect said taking over and to provide an error signal.

20 Claims, 7 Drawing Sheets

(51) Int. Cl.
*A63G 4/00* (2006.01)
*A63G 3/00* (2006.01)
*A63G 7/00* (2006.01)
*A63G 1/08* (2006.01)
*F16P 3/00* (2006.01)

(52) U.S. Cl.
CPC ............... *A63G 4/00* (2013.01); *A63G 7/00* (2013.01); *F16P 3/00* (2013.01)

(56) References Cited

U.S. PATENT DOCUMENTS

| | | | |
|---|---|---|---|
| 5,583,844 A * | 12/1996 | Wolf | A63G 31/16 472/43 |
| 5,865,543 A | 2/1999 | Maclean | |
| 6,481,731 B2 | 11/2002 | McHale | |
| 6,851,546 B2 | 2/2005 | Lodge | |
| 7,159,520 B2 * | 1/2007 | Casey | A63G 7/00 104/63 |
| 8,457,836 B2 | 6/2013 | Balasu et al. | |
| 8,515,687 B2 | 8/2013 | Pereira et al. | |
| 8,920,251 B2 | 12/2014 | Dietz et al. | |
| 2002/0135149 A1 | 9/2002 | McHale | |
| 2006/0065151 A1 | 3/2006 | Casey et al. | |
| 2010/0174495 A1 | 7/2010 | Pereira et al. | |
| 2010/0250047 A1 | 9/2010 | Balasu et al. | |
| 2010/0289647 A1 | 11/2010 | Rudduck et al. | |
| 2013/0079169 A1 | 3/2013 | Dietz et al. | |

FOREIGN PATENT DOCUMENTS

| | | |
|---|---|---|
| CN | 102341633 | 2/2012 |
| DE | 4430252 | 2/1996 |
| DE | 19746272 | 4/1999 |
| EP | 1464919 | 5/2007 |
| EP | 2145324 | 1/2010 |
| JP | 2009297316 | 12/2009 |
| JP | 2014083407 | 5/2014 |
| WO | 2006036218 | 4/2006 |
| WO | 2008128147 | 10/2008 |
| WO | 2010079382 | 7/2010 |

OTHER PUBLICATIONS

The State Intellectual Property Office of People'S Republic of China, "Office Action" and translation thereof, issued in Chinese Patent Application No. 201580065508.2, document of 18 pages, dated Aug. 1, 2018.

* cited by examiner

MECHATRONIC SAFETY SYSTEM FOR AMUSEMENT RIDES, AND IN PARTICULAR ROLLER COASTERS, CAROUSELS AND THE LIKE

CROSS REFERENCE TO RELATED APPLICATIONS

This application is a § 371 National Phase of PCT/EP2015/072782, filed Oct. 2, 2015, the entirety of which is incorporated by reference and which claims priority to German Patent Application No. 10 2014 114 338.8, filed Oct. 2, 2014.

BACKGROUND

The application relates to a mechatronic safety system for amusement rides and a method to increase the safety of amusement rides.

Known are safety systems that monitor the wear and tear of amusement ride components. EP 1 464 919 B1, for example, discloses a method and an apparatus for monitoring chain wear on chain drive units that are used for example in transportation systems such as leisure rides, in particular roller coasters.

If the safety system known from prior art detects a deterioration of the safety of an amusement ride, such as a deterioration of a load-bearing characteristic of a load-bearing component, the known safety systems will immediately suspend the operation of the amusement ride.

This is where the application begins.

SUMMARY

The present disclosure provides a safety system for amusement rides.

The present disclosure provides a mechatronic system for amusement rides with having the features and structures recited herein.

Mechatronic systems are characterized in that a sensor for sensing measured variables of a system state interacts with the particular mechanics of the system. In the present disclosure, one or more system-critical components, in particular load-bearing components of the ride, are operatively connected with redundant components which, at least partially, take over the function of the load-bearing component in case of a malfunction. This is detected by the sensor, so that then the ride can be safely stopped. Therefore, in contrast to known systems, the ride must be forced to shut down immediately in the event of a defect. A carousel, for example, can thus be returned to its end or start position. The redundant mechanical component must not necessarily be coupled with the component to be safeguarded; a type of bypass solution is conceivable as well.

Preferable embodiments and further developments of the present disclosure are further recited herein.

The apparatus according to the present disclosure for increasing the safety of rides with at least one mechatronic system is characterized in the mechatronic system having first means for detecting a change of at least one characteristic in at least one component of an amusement ride and second means compensating for the change of the characteristic for which a change was detected by the first means.

The advantage of such an apparatus is that the means can record and process a characteristic impairing the safety of the ride, for example the load-bearing function of a load-bearing component of an amusement ride. The load-bearing function of a load-bearing component of an amusement ride can then, for example, be taken over by the means.

Preferably, the use of the second means is controllable and/or adjustable by the first means. Thereby, the mechatronic system can preferably realize a control circuit, wherein the first means as the control variable can detect changes in the characteristics of components of an amusement ride and adjust the second means as correcting elements of a detected actual value of a characteristic of a component to a preset target value.

According to a preferred embodiment of the present disclosure, the first means can detect a change of at least one characteristic in at least one component during the operation of the ride. Thus, any safety risks can be detected in real time. Test runs performed in certain intervals to detect a security risk are therefore no longer necessary. A security risk that arises in between two consecutive test runs cannot be detected, which represents a safety problem for rides which are in operation during the test runs. The identification of safety risks in real time therefore has the advantage that arising safety risks can be detected immediately during the operation of the ride.

A further development of the present disclosure comprises the compensation of the change of the characteristic of the component for which a change in the first means was detected by the second means during operation of the ride. A possibly occurring safety risk can be therefore corrected during the operation of the ride without having to stop the operation of the ride. In particular, the safety risk can be remedied for a limited time. Subsequently, that is, after the detection of the failure of the primary component, the system is to be returned to a safe condition.

Preferably, the second means are passively and/or with regard to their safety function unstressed during a non-detection of change of at least one characteristic of at least one component. The first means are, however, permanently in use during the operation of the ride. In order to reduce the wear or, respectively, the consumption of the second means, it proves advantageous that the second means only come into use when a change of at least one characteristic in at least one component has been detected by the first means.

In a preferable embodiment of the present disclosure, the mechatronic system can be used on predetermined components, in particular mobile or immobile components, for example bolted connections. This allows the use of the mechatronic system for components, so-called "hot-spots" that are exposed to particularly high stress during the operation of the ride (e.g., strut mounts, axles of passenger gondolas, arms, and gondola suspensions). In such components, the probability of a safety risk is particularly high, which is why it might be advantageous to be able to monitor these components.

Preferably, the first means are able to mainly detect, changes in particular in wear and/or load-bearing behavior. Wear and changes in structural behavior are the most common factors that lead to a safety risk.

In a further development of the present disclosure, said first means are able to detect a total failure or failure of at least one component. The total failure of a component is very relevant to safety and must therefore always be recognized by a safety system.

Preferably, said first means can trigger an emergency stop upon detection of a total failure, i.e., an emergency shutoff of the amusement ride. Compared to the current response rate of the operating personnel, the mechatronic system can initiate an emergency stop faster and safer.

Preferably, the amusement ride should have as components welded assemblies for which changes in characteristics are detected, for example pipes that were welded together and/or bolts, fasteners, especially screws, and/or joints. These components are the components most commonly used in amusement rides and may represent particularly high safety risks. In addition, the amusement ride can have other mechanical components for which a change of a characteristic can be detected by the first means.

In a further development of the present disclosure, the first means of the mechatronic system comprise components for processing at least one electrical signal. Electrical signals are particularly easy to generate and quick to analyze and forward.

Preferably, the second means of the mechatronic system comprise mechanical modules, in particular load-bearing elements. The mechanical modules take on the primary function of the ride at the occurrence of a safety risk. As load-bearing components of amusement rides represent a particularly high safety risk, it is advantageous that the second means comprise load-bearing elements, so that, in the event of a safety risk, the primary function of load-bearing elements in rides, namely the load-bearing function, is taken over.

Preferably, the amusement ride is a roller coaster, water ride, a transport system, a simulator, or a carousel or the like. The application of the mechatronic system is not limited, however, to a particular type of ride, but can also be used in other types of the same category.

The method according to the present disclosure for increasing the safety of rides with an apparatus according to the invention is characterized in that, when a change occurs in at least one characteristic of at least one component of an amusement ride, the mechatronic system detects the change during the operation of the ride and triggers a control circuit that balances out the change. Depending on the ride, a safety risk can be detected in real time, for example in carousels, or almost in real time, for example in a roller coaster during the next stop, and addressed during the operation of the ride without shutting it down.

Preferably, in this process, the mechatronic system performs an emergency stop if the mechatronic system detects a total failure of at least one component of a ride emergency. An emergency stop performed by a mechatronic system is faster and safer compared to the current response rate of the operating personnel.

Preferably, test signals are generated during the operation of the ride, either continuously or randomly, and analyzed in order to monitor the availability of the mechatronic system. In doing so, the operational availability of the mechatronic system can be monitored as well.

BRIEF DESCRIPTION OF THE DRAWINGS

The present disclosure is explained in detail by the following figures. They show.

To avoid unnecessary repetition, FIGS. 1, 2 and 3 will be described together below. Like reference numerals in the figures each denote like reference parts.

DETAILED DESCRIPTION

Figure 1:
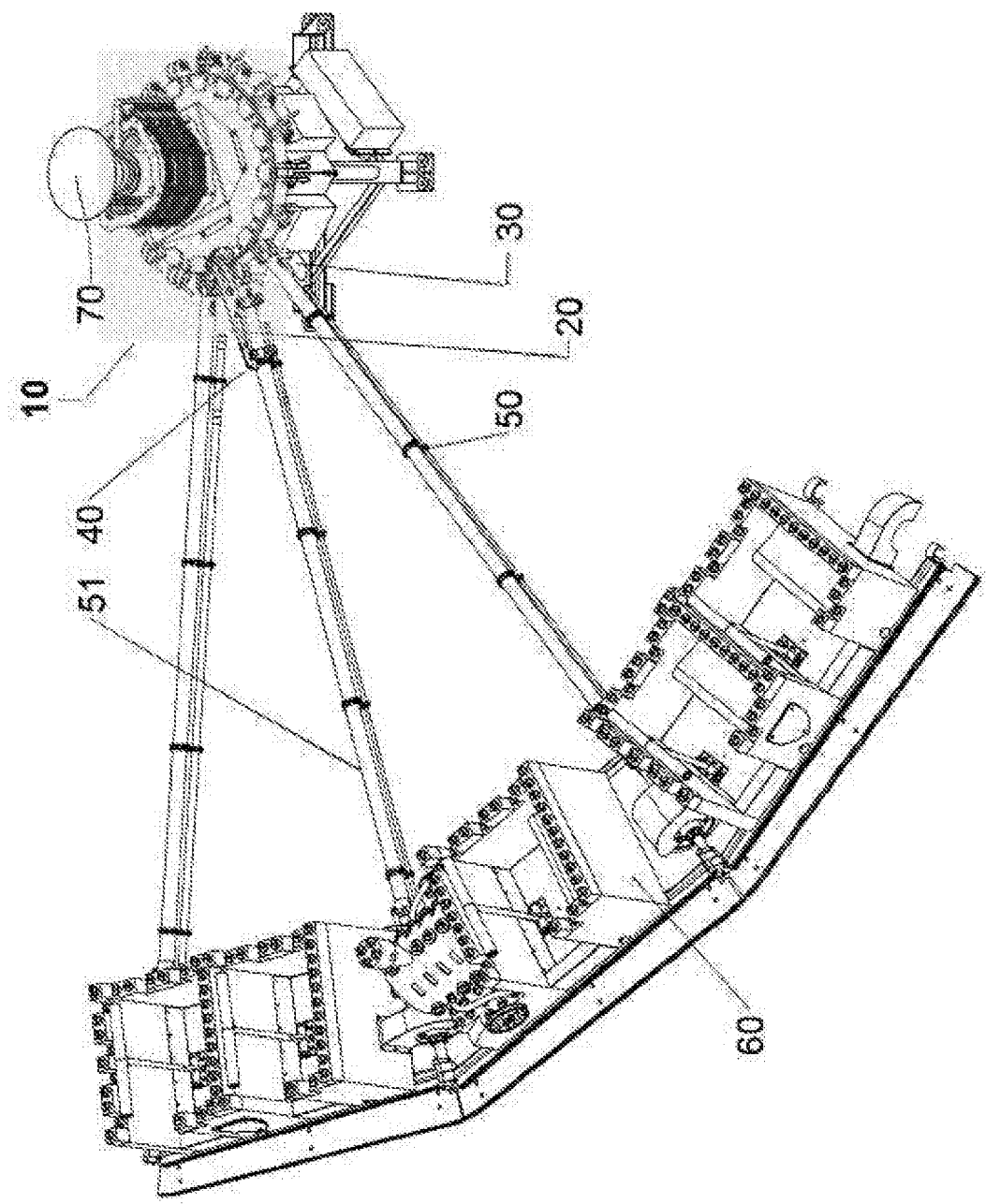
FIG. 1 A partial three-dimensional view of an embodiment of an apparatus according to the present disclosure with an embodiment of a mechatronic system, FIG. 2 A detail view of the mechatronic system according to FIG. 1, FIG. 3 A sectional view of the mechatronic system according to FIG. 1, FIG. 4 A schematic view of a load-bearing element in the form of a hollow tube in the intact state, FIG. 5 The hollow tube shown in FIG. 4 in a broken state, and thus in case of failure, FIG. 6 Another example of a shaft with internal pin, and
FIG. 7 An enlarged detail of the bolt shown in FIG. 6.

In FIG. 1, the connecting rods 51, which connect the carousel figures, in this case cars 60, with a vertical axis of rotation 70, correspond to the components 50 for which a characteristic change is to be detected. The components 50, which are attached to the vertical axis of rotation 70 by means of yokes 31, perform a superimposed movement during the operation of the carousel. On the one hand, the components 50 rotate around the vertical axis of rotation 70, while on the other hand, the components 50 move up and down along the vertical rotation axis 70 in a movement guided by the yokes 31. During the up-and-down movement, the components 50 support the weight of the cars 60 and thus assume a load-bearing function. The mechatronic system shown in FIG. 1 only shows one component 50. Preferably, a mechatronic system 20 can be mounted or retrofitted on any connecting rod 51 of the carousel.

Figure 2:
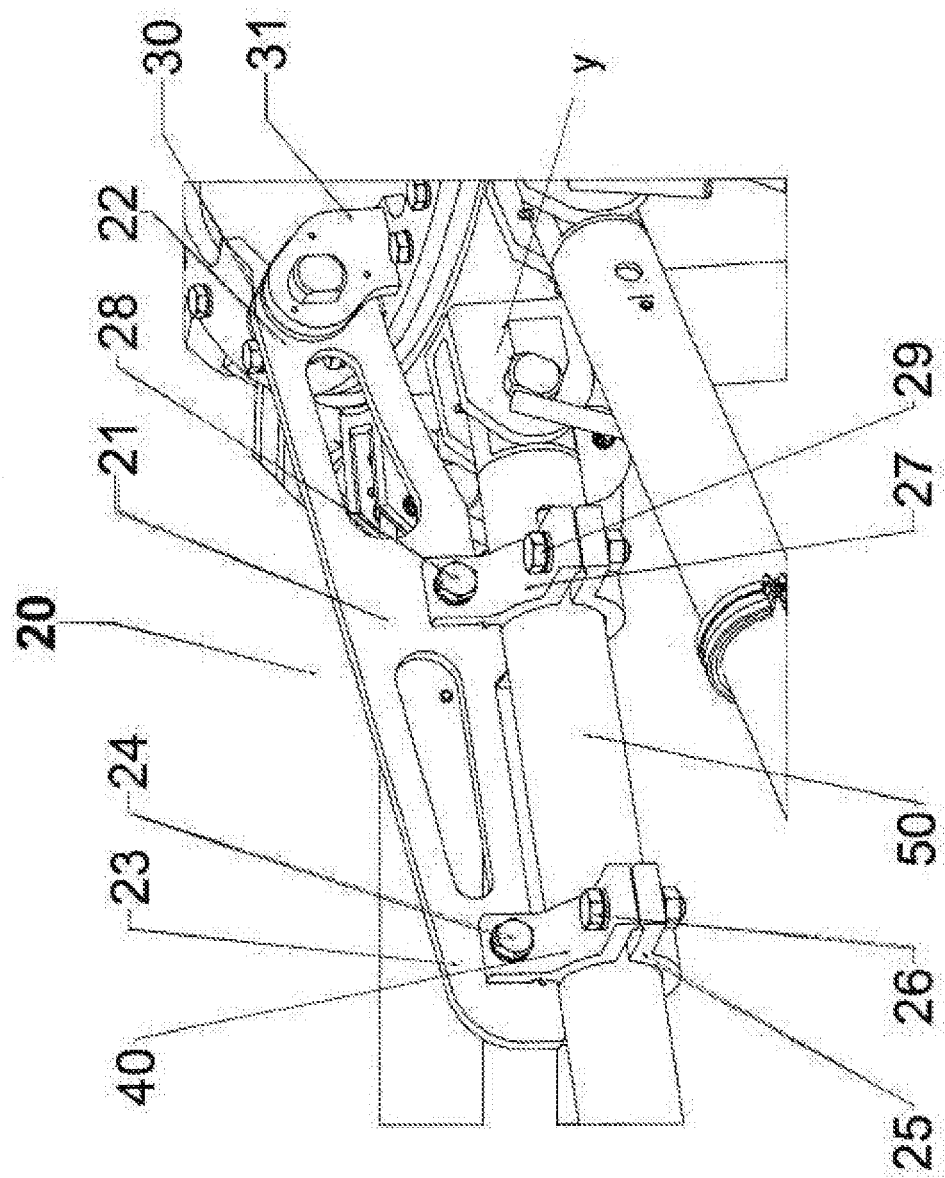

FIG. 2 shows particularly clearly how the mechatronic system 20 is mounted to components 50 of the carousel. At its one end 22, a joint 21 is attached to the vertical axis of rotation 70 of the carousel by means of a yoke 31, which forms a connection between the component 50 and the yoke 31. At the other end 23 of the joint 21, a first clamp 25 is attached by means of a screw joint 24. The first clamp 25 surrounds the components 50 and mounts the same by means of a screw joint 26. Between the two ends 22, 23 of the joint 21, a second clamp 27 is attached by a screw joint 28. The second clamp 27 also surrounds the component 50 and clamps the same by means of a screw joint 29.

The joint 21 together with the yoke 31 attached to the vertical axis of rotation 70 and the first clamp 25 and the second clamp 27 take over a part of the mechatronic system 20. If, during operation of the carousel, the load-bearing function of component 50 is affected, for example through material wear on the yoke 31, which performs the upward and downward movement of the component 50 and is exposed to particularly high stresses during operation of the carousel, then this part can take over the load-bearing function of the component 50. The material wear may also occur on a component that performs a primary function of the ride. The yoke 31 as part of a secondary system is, with its connection to the component 50, redundant to a joint Y, to which the component 50 is mounted.

Figure 3:
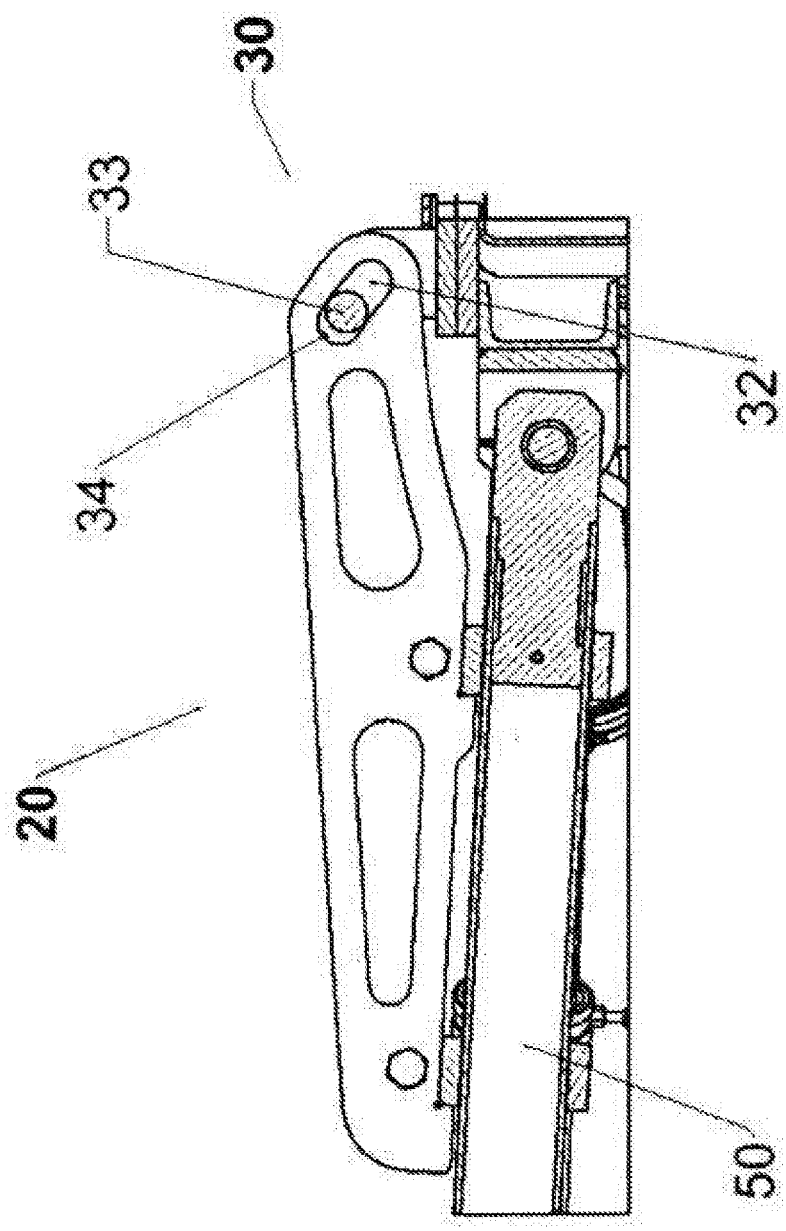

The sectional view of FIG. 3 clearly shows how a change in the load-bearing function of component 50 and thus the coming into effect of the function of the redundant part can be detected. The end 22 of the joint 21, to which the joint 21 is attached by means of a yoke 31 on the vertical axis of rotation 70, has a recess 32 through which a fastening means 33, for example a clamping bolt, passes for attaching the joint 21 to the yoke 31. The recess 32 is dimensioned such that, with regard to safety risks occurring during a normal operation of the carousel and defined tolerance ranges, the edge 34 of the recess 32 does not come in contact with the fastening means 33 that go through the recess 32. If the load-bearing function of component 50 changes during the operation of the carousel in a way that affects safety, that is, if the up-and-down movement of the component 50 changes in an important area, the fastening means 33 come in contact with the edge 34 of the recess 32, if the recess was dimensioned appropriately. Thus, the properly dimensioned recess 32 constitutes a means 30 that detects the change in the load-bearing function of the component 50 and the coming into effect of the load-bearing function of the joint 21. The attachment means 33 that goes through the recess 32 and the recess 32 can be configured in such a way that when the edge 34 of the recess 32 comes into contact with the attachment means 33, an electrical signal is generated which can be read as a warning or distress signal.

If the contact of the edge 34 of the recess 32 with the fastening means 33 passing through the same is detected preferably by a force sensor, the first means 30 are able to perform an emergency stop in the event a defined maximum amount of the contact force is exceeded, which would correspond to a total failure of the component 50, in particular of the yoke 31.

Figure 4:
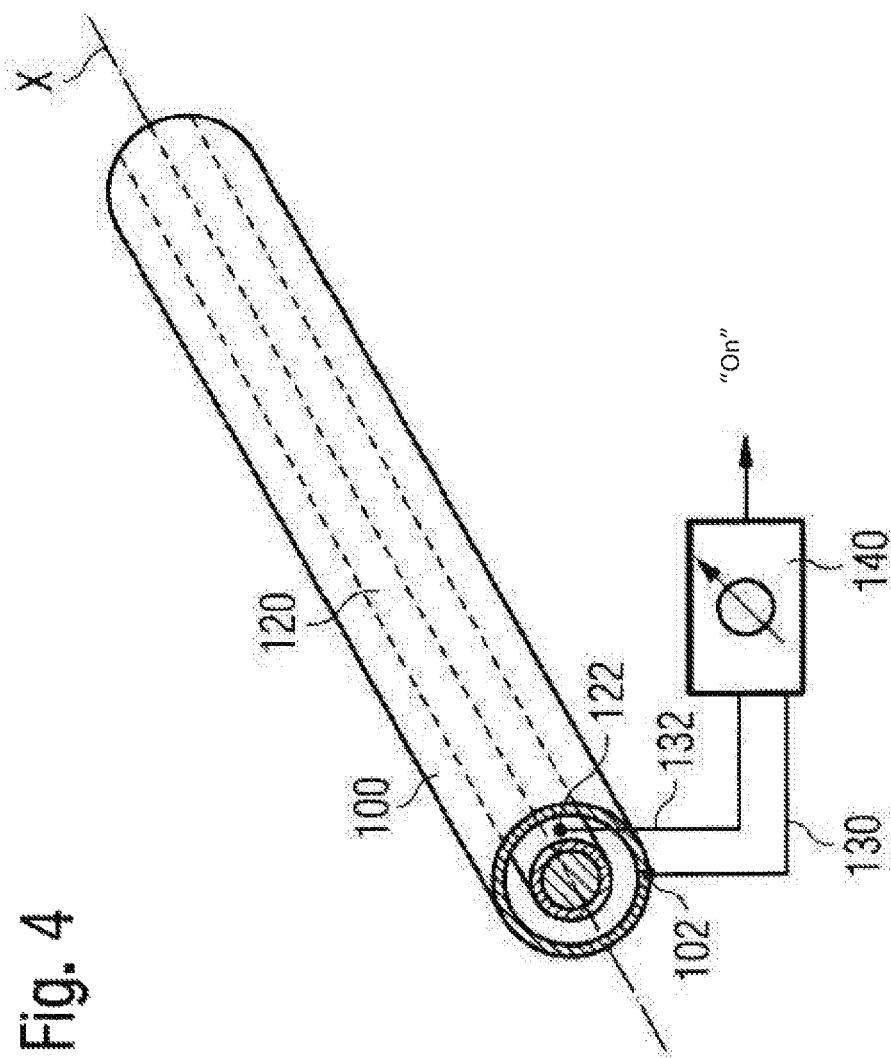

FIG. 4 shows another example of a component that is commonly used in amusement rides. This is a hollow tube 100 that can be used in an amusement ride as a bearing tube or wheel shaft. The hollow tube 100 may be a hollow shaft as well. A rod 120 is located in the interior of said hollow tube 100 concentric to the center axis X. The rod 120 may also be a shaft. The hollow tube 100 and the rod 120, which may be made from metal, do not touch, but are provided with suitable electrical contacts 102, 122. The contacts 102, 122 each constitute contact areas. These contacts 102, 122 are connected with a control unit 140 through lines 130, 132. The control unit 140 checks whether the contacts 102, 122 touch each other or not. Ideally, that is, if the hollow shaft 100 is intact, the contacts 102 and 122 are not connected. To this purpose, the contact 102 is, for example, electrically connected with a conductive coating, which is attached to the inner wall of the hollow tube 100. The contact 122 is, for example, connected to a conductive coating on the outside of the rod 120. The conductive coatings mentioned are preferably mounted to the inside of the hollow tube 100 and the outside of the rod 120 across their entire surface. Because the hollow tube 100 and the rod 120 do not touch when the hollow tube 100 is intact, the control unit 140 does not detect a short circuit between the contacts 102, 122 either. The control unit 140 can signal proper operation, for example through the issuance of an on signal by the control unit 140.

Figure 5:
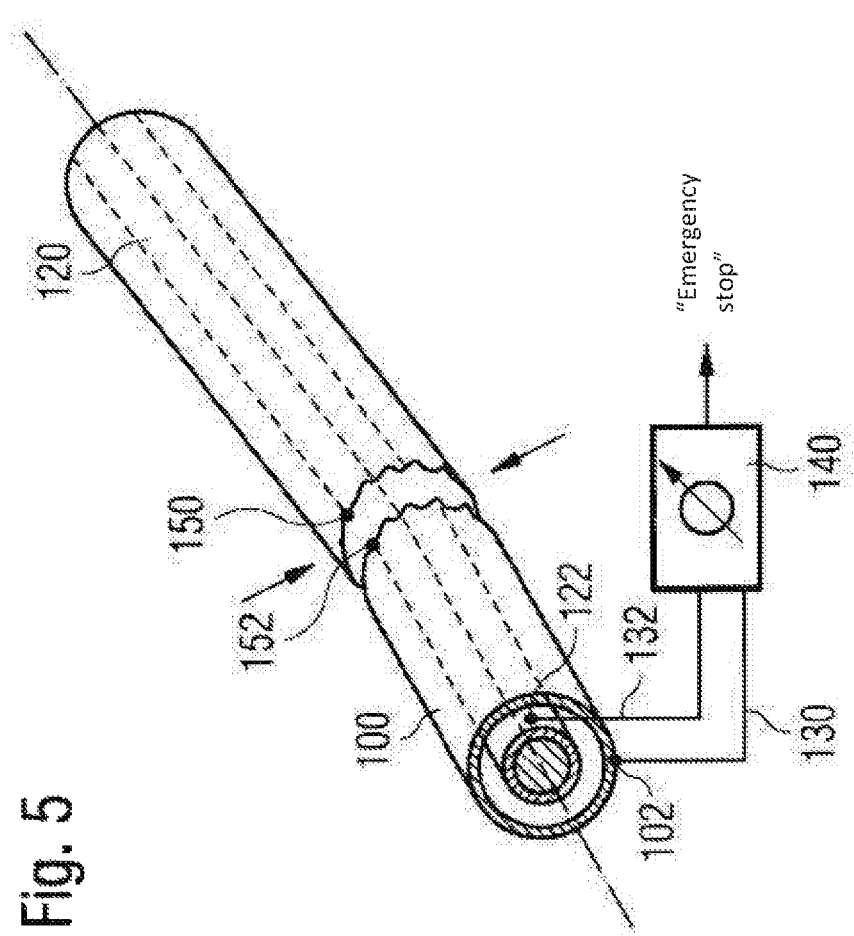

FIG. 5 schematically illustrates the breaking of the hollow tube 100. Such a break can occur, for example, due to a material fatigue of the hollow tube 100 or a sudden external mechanical load. The breaking point of the hollow tube 100 is marked with arrows in FIG. 5. This breaking of the hollow tube 100 causes the sections of the hollow tube 100 to strike the separately held inner rod 120. In this process, the conductive coating on the inside of the hollow tube 100 comes in contact with the conductive coating on the outside of the rod 120. These contact points are marked in FIG. 5 with the reference numbers 150 and 152. This short circuit is conveyed by means of the contacts 102, 122 and the lines 130, 132 to the control unit 140, which then emits a signal indicative of the malfunction of the hollow tube 100. Since the rod 120 located in the interior of the hollow tube 100, however, still takes over the load-bearing function of the hollow tube 100 at least temporarily, the ride does not have to come to an emergency stop immediately after the break. Rather, it is possible that the ride, for example, finishes its current run and that it will only suspend operations thereafter.

Although it is mentioned in connection with the embodiment shown in FIG. 4 and FIG. 5 that the monitoring of the hollow tube 100 is performed electrically, this is easily possible by means of an optical monitoring as well, for example scanners. Monitoring can also be performed electromagnetically, for example, by means of radio, Bluetooth, and/or WLAN, etc.

In a further development of the present disclosure, it is also possible to provide a permanent contact between the rod 120 and the hollow tube 100 in the intact state of the hollow tube 100 and to generate the error signal only when this constant contact is interrupted. Such an embodiment will be explained in greater detail in connection with FIGS. 6 and 7.

Figure 6:
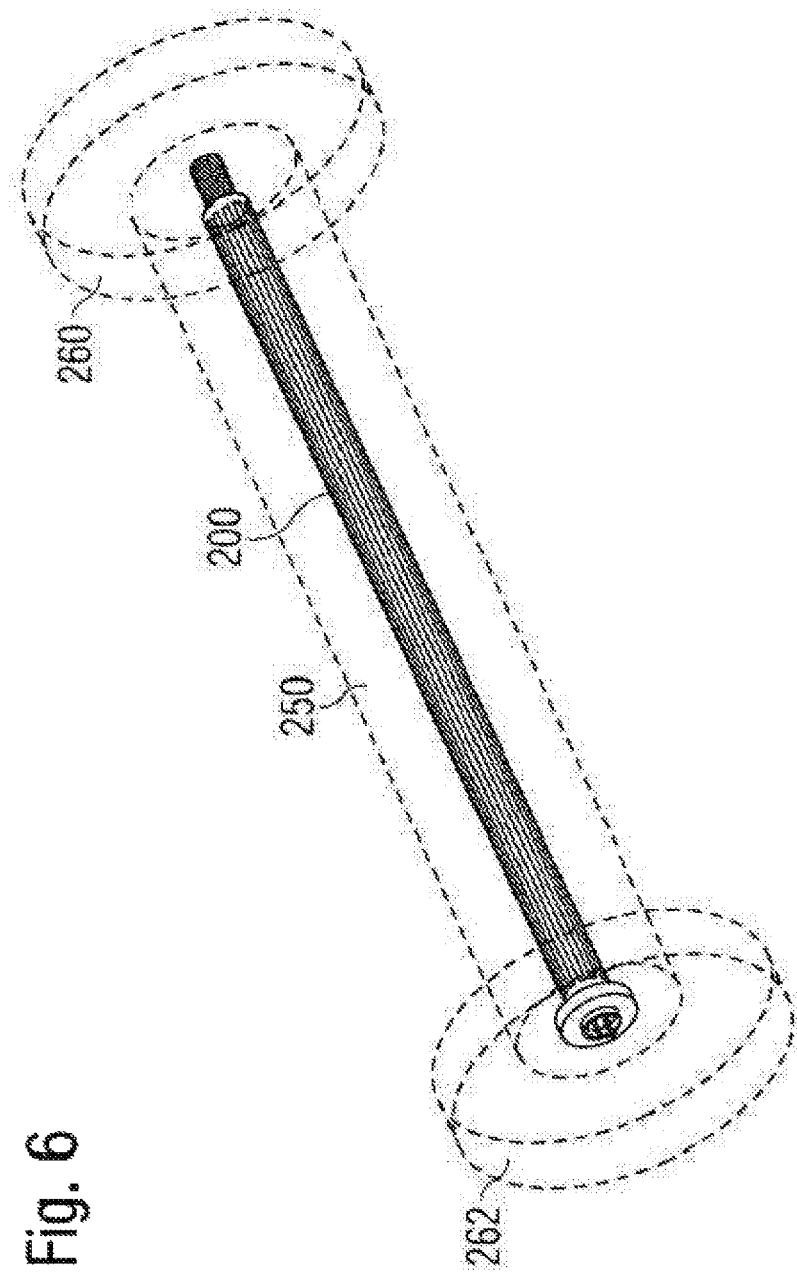
Figure 7:
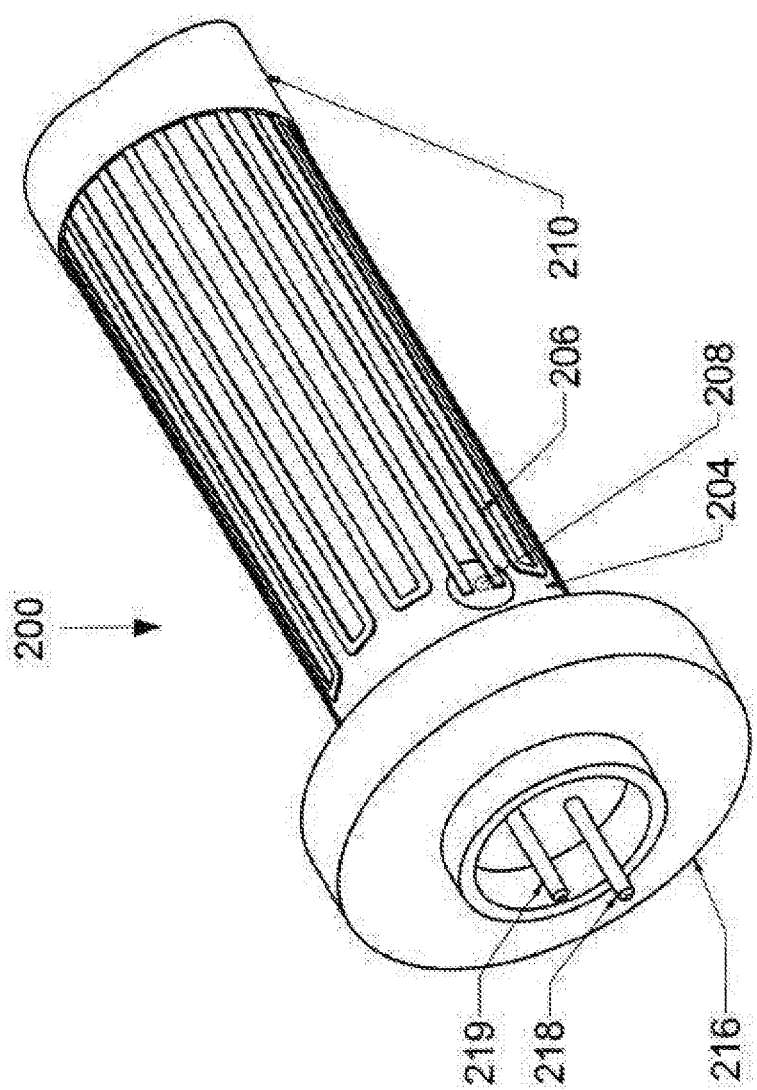

FIG. 6, in turn, shows a shaft 250 with two wheels 260, 262 arranged on the left and right side. Inside the shaft 250, there is now a bolt 200 which is shown in more detail in FIG. 7. The bolt 200 is arranged within the shaft 250. To this purpose, the shaft 250 is hollow. The bolt 200 is designed such that it cannot bear the loads of the shaft 250 in the event of breakage. In this case, other form- and force-fit geometries take over the safety function such as a load-bearing function until the ride is shut down. If the shaft, which may be a connecting pin also, breaks, then the bolt 200 breaks as well as a result of excessive stress. To detect this break, a microstructured conductor 206 in the form of a meander is mounted to the bolt 200 between two insulating layers 204, 210. It is possible to run several such conductors in parallel as well, so that multi-channel and therefore redundant monitoring would be possible. If the bolt 200 breaks due to excessive stress, said conductor 206 is also interrupted at one point at least. This interruption results in a significant change in electrical resistance from low impedance to high impedance, which is relayed by a suitable control unit which is connected to the electrical terminals 218, 219 associated with the conductor 206.

In this arrangement, no contact is established when the shaft 250 breaks, but a closed contact is permanently opened to generate an error signal from the control unit. It should be noted in conclusion that, for reasons of clarity, it was decided not to show a component in FIGS. 6 and 7 that takes over the load-bearing capacity of the shaft 250 in the event it breaks. The reference number 216 that is also mentioned in FIG. 7 identifies a ring 216 that is used to mount the bolt 200 inside the shaft 250.

LIST OF REFERENCE NUMBERS

10 Apparatus
20 Mechatronic system
21 Joint
22 End
23 End
24 Screw connection
25 Clamp
26 Screw connection
27 Clamp
28 Screw connection
29 Screw connection
30 Means
31 Yoke
32 Recess
33 Attachment means
34 Edge
40 Means
50 Component
51 Connecting rod
60 Car
70 Axis of rotation
100 Hollow tube
102 Contact 120 Rod
122 Contact
130 Line
132 Line
140 Control unit
150 Area of contact
152 Area of contact
200 Bolt
204 Insulating layer
206 Conducting layer
208 Bore
210 Insulating layer
216 Shaft
218 Connector
219 Connector
250 Shaft
260 Wheel
262 Wheel
X Axis
Y Joint

The invention claimed is:

1. An apparatus for increasing the safety of amusement rides, with at least one mechatronic system, comprising:
    mechanical means to fully or at least partially take over a load-bearing function of a defective mechanical component, and
    a second electrical means to detect a defect of the mechanical component and to provide an error signal wherein the mechanical component is a structural part which takes over a supporting function of a load-bearing component of the amusement ride,
    wherein the mechanical means takes over the load bearing function in the event of a defect, and
    wherein the electrical means comprises optical means for monitoring the mechanical component or at least partially arranged on the mechanical component electrical means.

2. The apparatus according to claim 1, wherein the second means generate an emergency stop signal.

3. The apparatus according to claim 1, wherein the mechanical means comprise a redundant further component to take over the function of the mechanical component, the mechanical component and the further component being coupled to a control unit.

4. The apparatus according to claim 3, wherein the coupling of the control unit is formed with the mechanical component and the further component electronically, electromagnetically, and/or optically.

5. The apparatus according to claim 1, wherein the mechanical component is a hollow tube in which a rod is located as a second component.

6. The apparatus according to claim 5, wherein the hollow tube and the rod are electrically and/or optically coupled to one another in such a way that a contact of the hollow tube and the rod provides an error signal in a control unit.

7. The apparatus according to claim 1, wherein the apparatus can be retrofitted to existing rides.

8. The apparatus according to claim 1, wherein a change in at least one characteristic in at least one component is detectable by the first means during operation of the ride.

9. The apparatus according to claim 1, wherein the change of the characteristic of the component for which a change was detected by the first means is compensated by the second means during operation of the ride.

10. The apparatus according to claim 1, wherein the second means passively and/or with regard to their safety function unstressed during a non-detection of change of at least one characteristic of at least one component.

11. The apparatus according to claim 1, wherein the mechatronic system is arranged on movable or immovable components.

12. The apparatus according to claim 1, wherein the first means can detect wear and/or a change in the bearing capacity in one component.

13. The apparatus according to claim 1, wherein the first means can detect a total failure of at least one component.

14. The apparatus according to claim 13, wherein the first means can trigger an emergency stop of the ride upon detection of total failure.

15. The apparatus according to claim 1, wherein the ride has as components welded assemblies and/or bolts, fasteners, in particular screws, and/or joints.

16. The apparatus according to claim 1, wherein the first means of the mechatronic system comprise components for processing at least one electrical signal.

17. The apparatus according to claim 1, wherein the second means of the mechatronic system have mechanical modules, in particular load-bearing elements.

18. A method for increasing the safety of an amusement ride, and in particular carousels or roller coasters, comprising the steps of:
    providing a sensor device which detects when a component to be protected is replaced by a redundant component in its function, wherein the sensor devices is at least partially attached the component to be protected, and
    generating an error signal as soon as the sensor device detects that a load-bearing function has been taken over.

19. The method according to claim 18, wherein the mechatronic system performs an emergency stop of the ride when a total failure of at least one component of a ride is detected.

20. The method according to claim 18, wherein test signals are permanently or randomly generated and evaluated during operation of the ride to monitor the availability of the mechatronic system.

* * * * *